Figure 1:
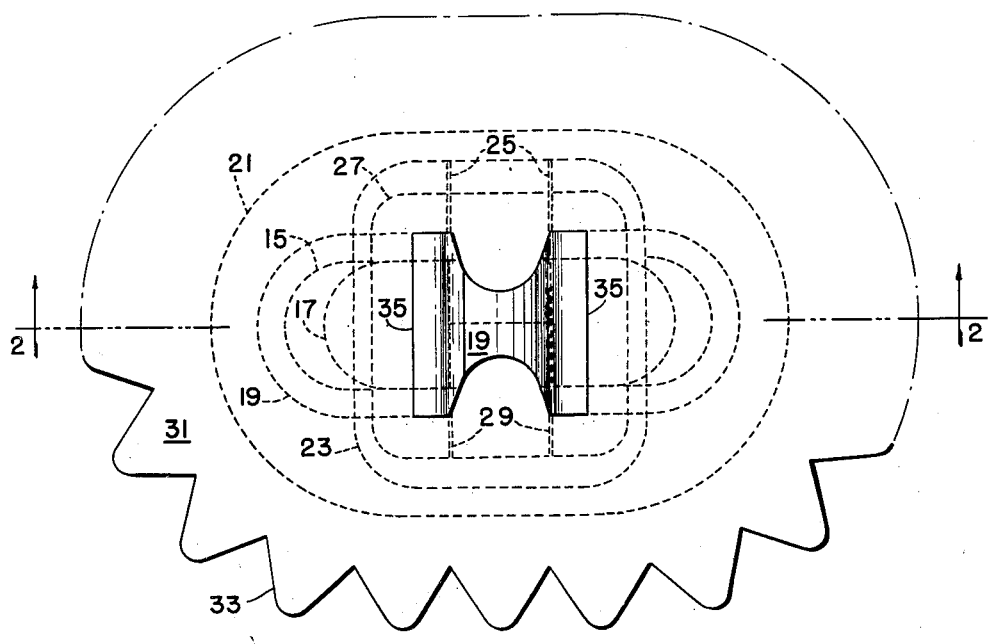

Feb. 28, 1950 G. V. WHITTLE 2,498,729
GUIDE PATCH
Filed May 8, 1947

INVENTOR.
GEORGE V. WHITTLE
BY *M. A. Hayes*
ATTORNEY

Patented Feb. 28, 1950

2,498,729

UNITED STATES PATENT OFFICE 2,498,729

GUIDE PATCH

George V. Whittle, Toms River, N. J.

Application May 8, 1947, Serial No. 746,844

11 Claims. (Cl. 244—127)

(Granted under the act of March 3, 1883, as amended April 30, 1928; 370 O. G. 757)

This invention relates to improvements in airship load-attachment devices, and more particularly to improvements in guide-patches adapted to secure lines to lighter-than-air craft.

The tape-finger type of patch and other types of patches that have been used on lighter-than-air craft as mounts for beckets, in order to distribute large concentrated loads over a substantial area of the enevelope fabric, are designed to exert a shearing force only between the patch and the envelope. However, it has been found that unless such a patch is located accurately and aligned with reference to the direction of the force to be applied, so that the line or cable that transmits the load to the patch is within a few degrees of the axis of symmetry of the patch both in plan and elevation, the patch is subject to forces other than shear, and fails when relatively low loads are applied.

Particularly in connection with the expeditionary operation of lighter-than-air craft from mooring masts at advance bases, in order to facilitate inspection and repair it is necessary to provide means for enabling personnel to gain access to the top of the envelope of the craft. For these purposes, a long life-line is installed, said line being secured at the bow proximate the mooring gear and extending to a point on top of the envelope near the maximum diameter of said envelope, at which point it is likewise secured. In use, a rigger climbs to the top of the mooring mast and pulls himself up the sloping surface of the envelope by a hand-over-hand gripping and pulling on the secured line. In view of the required length of the line, it is apparent that the line must also be secured to the envelope every several feet along its length: to keep the line positioned accurately along the center line of the curved top surface of the enevolpe, a plurality of intermediate patches adapted to secure the line must be employed. To enable the rigger to hold the line at waist height, the line must have sufficient slack between patches. This entails employment of patches that remain affixed securely to the envelope despite application of a load by the rigger at a large angle to the surface of the envelope and at any angular direction within a hemisphere.

Satisfaction of the above-mentioned operating requirements was sought by the expedient of mounting two opposed finger-type patches with the cable or line secured between them. However, this construction, or the use of a plurality of opposed finger-type patches, is excessively heavy and expensive, and presents an appreciable break in the streamline contour of the envelope.

The primary object of the invention is to provide a guide-patch of simple and durable construction adapted to secure a cable or line to an object such as a lighter-than-air craft envelope.

Another object is to provide a guide-patch wherein applied load force falls within the base of a becket constructed integral therewith.

A further object is to provide a guide-patch wherein the component members are so proportioned and distributed that adequate strength obtains against loads applied in all directions.

Still another object is to provide a guide-patch wherein peeling action under load conditions is distributed over a relatively large area.

Another object is to provide a device adapted to be secured rigidly to the envelope of a lighter-than-air craft and to provide thereon convenient means for securing cables or lines to the craft.

A further object is to provide a relatively light and inexpensive guide-patch that presents a comparatively small break in the streamline contour of the envelope.

Figure 2:
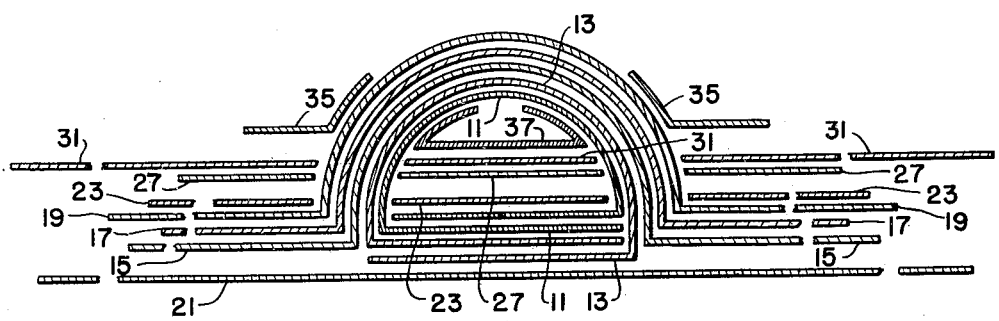

Other objects and advantages of this invention as well as its construction, arrangement and operation will be apparent from the following description and claims in connection with the accompanying drawing, in which Fig. 1 is a plan view of a guide-patch, showing a preferred embodiment of the invention; and Fig. 2 is an exploded schematized section thereof taken on the line 2—2 of Fig. 1.

The guide-patch illustrated in the drawings comprises a plurality of plies or layers of sheet materials bonded together by suitable adhesives. Preferred materials employed are hereinafter described; for clarity of description, structure and the sequence and method of assembly are first set forth:

A first D ring 11 is generally rectangular in plan, except for arcuately recessed medial portions of opposed longitudinal edges forming a neck between the end portions thereof. A selected end portion is rotated relative the other end portion until the front face of the selected end portion is superposed by the nether face of said other end portion, and said adjacent faces are bonded by suitable adhesive to form a generally D-shaped ring.

A second D ring 13 is, preferably, of substantially the same shape and dimensions as said first D ring 11. A front face of a selected end portion of said second D ring 13 is bonded by suitable adhesive to the nether face of the end portion of said first D ring 11. The other end portion of said second D ring 13 is rotated around said first D ring 11 until the front face of said other end portion is superposed by the nether face of the said selected end portion of the second D ring 13, and said adjacent faces are bonded by suitable adhesive. Preferably, the homologous D shaped rings formed as above described are wound in opposite directions, as shown in Fig. 2.

A first strap 15 is generally rectangular in plan, except for arcuately recessed medial portions of opposed longitudinal edges forming a neck between the end portions thereof, and further excepting arcuate, preferably semicircular, lateral edges. The nether face of the medial portion of said strap 15 is bonded to the external arcuate face portion of the D ring 13 by a suitable adhesive, and the respective end portions of said strap 15 extend in opposite directions a predetermined distance in the plane of the plane portions of said D rings 11 and 13.

A second strap 17 is, preferably, of substantially the same shape and dimensions as said first strap 15, except that it is somewhat shorter in length than said first strap 15. The nether face of the second strap 17 is bonded to the external face of the first strap 15 by a suitable adhesive, said straps 15 and 17 being congruous over a substantial portion of their dimensions.

A third strap 19 is, preferably, of substantially the same shape as said first strap 15, except that it is somewhat longer than said first strap 15 and further excepting that the neck portion is somewhat wider. The nether face of the third strap 19 is bonded to the external face of the second strap 17 by a suitable adhesive; said straps 17 and 19 being congruent over a substantial portion of their dimensions. The edges of the neck portion of said third strap 19 are folded over the adjacent edges of the neck portions of the said first and second straps 15 and 17 and the D rings 11 and 13, and bonded to the nether face of the neck portion of said D ring 11 by suitable adhesive.

A base sheet 21, having the shape of an elongated ellipsoid and being substantially larger in area than the strap 19, is positioned symmetrical the plies hereinabove described and bonded to the nether faces of the D ring 13, strap 15 and strap 17 by suitable adhesive.

A first strap cover 23, having the shape of a square except for arcuate corner portions, preferably of dimensions somewhat less than the width of the base sheet 21, is provided with a pair of parallel spaced slots and with parallel spaced cuts 25 extending to an edge of said strap cover 23, said slots and cuts being adapted to seat said strap cover 23 symmetrically upon the strap 19, with the medial portion of said strap cover 23 seated upon the inner plane face of the D ring 11. Said first strap cover 23 is bonded to the upper face of the plane portions of the strap 19 and the D ring 11, and to the base sheet 21 by suitable adhesive.

A second strap cover 27, having the shape of a square except for arcuate corner portions, preferably of dimensions somewhat smaller than the first strap cover 23, is provided with a pair of parallel spaced slots and with parallel spaced cuts 29 extending to an edge of said strap cover 27, said slots and cuts being adapted to seat said strap cover 27 symmetrically upon the strap cover 23, with the medial portion of said strap cover 27 seated upon the strap cover 23 interior the D defined by the D ring 11. Said second strap cover 27 is bonded to the strap cover 23 by suitable adhesive, with the cuts in the respective strap covers oppositely disposed—that is to say, extending to opposite edges of the respective strap covers.

A top sheet 31, having the shape of an elongated ellipsoid and being substantially larger in area than the base sheet 21, is provided with a serrated or notched perimeter 33 and a symmetrically-medial H-cut adapted to seat said sheet 31 in a plane parallel to the plane of the strap covers 23 and 27. Said top sheet 31 is bonded to the strap cover 27 (both external and internal the D defined by the D ring 11), the strap cover 23, the strap 19 and the base sheet 21 by suitable adhesive.

A plurality of tapes 35 adapted to seal the joints between the strap cover 19 and the top sheet 31 are bonded thereto by suitable adhesive, and a tape 37 adapted to seal the joints between the top sheet 31 and the D ring 11 is bonded thereto by suitable adhesive.

The materials used for the guide patch above described can be varied within relatively wide limits and the nature of preferred materials and substitutes therefor is apparent to those skilled in the art. However, the following materials are suggested:

General considerations applicable to all component plies include the desirability of using materials adapted to be bonded securely to adjacent plies with a suitable adhesive, and being materials characterized by relatively light weight, great tensile strength and high resilience, and adapted to be cut and formed facilely to desired shapes. Secondary considerations include the costs of materials employed and the relative costs of fabricating alternative materials.

The D rings 11 and 13, straps 15, 17 and 19, and strap covers 23 and 27 are constructed generally of a tough flexible material such as warwic, woven tire cord, or similar material. The base sheet 21 and top sheet 31 preferably are made of a type of material used for the construction of the envelope of lighter-than-air craft, such as rubberized cloth having an aluminum or aluminum-like coating. These plies preferably have weather and wear resistance qualities equivalent to the weather and wear resistance qualities of the envelope. The tapes 35 and 37 are, preferably, rubberized fabric. A self-curing cement rubber can be employed as the bonding agent.

The use and operation of the guide-patch above described is apparent. Said guide-patch is bonded to the envelope of the lighter-than-air craft in desired position by suitable adhesive and a cable or line is secured to the loop thereof.

The device is firm and secure, resisting a pull in any direction within a hemisphere.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A guide-patch comprising a plurality of plies of sheet material of a plurality of shapes, first selected plies being formed into rings, a selected portion of said rings being bonded to adjacent plies, second selected plies being bonded to a selected portion of the internal face surface of said ring-formed plies and to said adjacent plies, and third selected plies being bonded to the face of said second plies distal said ring-formed plies.

2. A guide-patch comprising a plurality of plies of sheet material of a plurality of shapes, including a plurality of first selected plies formed into concentric rings and bonded together, a plurality of second selected plies bonded together with at least one of said second selected plies bonded to a substantial portion of the outer face of one of said first selected plies, a plurality of third selected plies bonded together with at least one of said third selected plies bonded to the outer face of one of said first selected plies and to a face of at least one of said second selected plies, a fourth selected ply bonded to at least one of each of said second and third selected plies and a fifth selected ply bonded to at least one of said third selected plies and to said fourth selected ply.

3. A guide patch comprising a plurality of plies of sheet material of a plurality of shapes, including a plurality of first selected plies formed into concentric rings and bonded together, a plurality of second selected plies bonded together with at least one of said second plies bonded to a substantial portion of the outer face of one of said first selected plies, a plurality of third selected plies bonded together with at least one of said third selected plies bonded to the outer face of one of said first selected plies and to a face of more than one of said second selected plies, a fourth selected ply bonded to more than one of said second selected plies and to more than one of said third selected plies, and a fifth selected ply bonded to more than one of said third selected plies and to said fourth selected ply.

4. A guide-patch comprising a plurality of plies of sheet material, including a plurality of generally rectangular strips formed into concentric D rings and bonded together, a generally rectangular strap having a medial portion bonded to the arcuate portion of the outer face of one of said D rings, a generally square strap cover bonded to the plane portion of the inner face of one of said D rings and to the plane portions of a face of said strap, a generally elongated-ellipsoidal base sheet bonded to the plane portion of the outer face of one of said D rings, and to portions of said strap and said strap cover, and a generally elongated-ellipsoidal top sheet bonded to said strap cover internal and external said D rings and to said base sheet, said top sheet extending beyond the area of said base sheet.

5. A guide-patch comprising a plurality of plies of sheet material, first selected plies being formed into rings, a selected portion of said rings being bonded to adjacent plies, second selected plies being bonded to a selected portion of the internal face surface of said ring-formed plies and to said adjacent plies, and third selected plies being bonded to the face of said second plies distal said ring-formed plies.

6. A guide-patch comprising a plurality of plies of sheet material, a first selected ply being formed into a ring, a selected portion of said ring being bonded to adjacent plies, second selected plies being bonded to a selected portion of the internal face surface of said ring-formed ply and to said adjacent plies, and third selected plies being bonded to the face of said second plies distal said ring-formed ply.

7. A guide-patch comprising a plurality of plies of sheet material, a first selected ply being formed into a ring, a selected portion of said ring being bonded to adjacent plies, second selected plies being bonded to a selected portion of the internal face surface of said ring-formed ply and to said adjacent plies, and a third selected ply being bonded to the face of said second plies distal said ring-formed ply.

8. A guide patch comprising a plurality of plies of sheet material, selected plies being formed into rings, each of said plies being secured to at least two adjacent plies.

9. A guide patch comprising a plurality of plies of sheet material of a plurality of shapes, selected plies being formed into rings, each of said plies being secured to at least two adjacent plies.

10. A guide patch comprising a plurality of plies of sheet material of a plurality of shapes, selected plies being formed into rings, a selected portion of said rings being bonded to adjacent plies, each of said plies other than said ring-formed plies being bonded to selected portions of at least two adjacent plies.

11. A guide patch comprising a plurality of plies of sheet material of a plurality of shapes, selected plies being formed into rings, a selected portion of said rings being bonded to adjacent plies, each of said plies other than said ring-formed plies being secured adhesively to all contiguous portions of at least two adjacent plies.

GEORGE V. WHITTLE.

REFERENCES CITED

The following references are of record in the file of this patent:

UNITED STATES PATENTS

| Number | Name | Date |
|---|---|---|
| 1,292,596 | Gammeter | Jan. 28, 1919 |
| 1,849,965 | Switlik | Mar. 15, 1932 |